United States Patent
Riehm

(10) Patent No.: US 9,873,224 B2
(45) Date of Patent: Jan. 23, 2018

(54) RESHAPING METHOD AND DEVICE FOR CARRYING OUT THE METHOD

(71) Applicant: Hermann Ultraschalltechnik GmbH & Co. KG, Karlsbad (DE)

(72) Inventor: Ulf Riehm, Ettlingen (DE)

(73) Assignee: Hermann Ultraschalltechnik GmbH & Co. KG, Karlsbad (DE)

( * ) Notice: Subject to any disclaimer, the term of this patent is extended or adjusted under 35 U.S.C. 154(b) by 461 days.

(21) Appl. No.: 14/350,927

(22) PCT Filed: Oct. 5, 2012

(86) PCT No.: PCT/EP2012/069755
§ 371 (c)(1),
(2) Date: Apr. 10, 2014

(87) PCT Pub. No.: WO2013/053652
PCT Pub. Date: Apr. 18, 2013

(65) Prior Publication Data
US 2014/0230994 A1    Aug. 21, 2014

(30) Foreign Application Priority Data
Oct. 10, 2011    (DE) .................. 10 2011 054 358

(51) Int. Cl.
*B29C 65/00* (2006.01)
*B29C 65/08* (2006.01)
(Continued)

(52) U.S. Cl.
CPC ............ *B29C 65/08* (2013.01); *B29C 65/602* (2013.01); *B29C 65/607* (2013.01); *B29C 66/21* (2013.01);
(Continued)

(58) Field of Classification Search
CPC ......... B29C 65/00; B29C 65/08; B29C 65/60; B29C 65/602; B29C 65/607; B29C 66/00;
(Continued)

(56) References Cited
U.S. PATENT DOCUMENTS 3,754,310  A  *  8/1973  Shea .................... B29C 66/41
                                                   264/249
4,478,544  A  *  10/1984  Strand .................. B29C 66/41
                                                   411/34
(Continued)

FOREIGN PATENT DOCUMENTS

EP    0543721 A1    5/1993
EP    2095930 A2    9/2009
(Continued)

*Primary Examiner* — Jacob T Minskey
*Assistant Examiner* — Matthew Hoover
(74) *Attorney, Agent, or Firm* — Michael L Dunn

(57) ABSTRACT

The present invention relates to a method for reshaping a workpiece, in which a reshaping force is exerted on the workpiece by means of a reshaping tool and the workpiece is heated during or before the reshaping of the workpiece, wherein the heating of the workpiece is performed by the at least partial absorption of an ultrasonic vibration in the workpiece. In order to provide a method and a device for reshaping a workpiece that avoids the aforementioned. disadvantages, in particular when reshaping materials with a highly temperature-dependent damping constant, it is proposed according to the invention that, before the reshaping force is applied to the workpiece, at least a first portion of the workpiece is brought to a temperature which differs from the temperature of a second portion of the workpiece that comes into contact with the reshaping tool.

12 Claims, 3 Drawing Sheets

(51) Int. Cl.
*B29C 65/60* (2006.01)
*F16B 19/10* (2006.01)

(52) U.S. Cl.
CPC ...... *B29C 66/347* (2013.01); *B29C 66/81419* (2013.01); *B29C 66/81425* (2013.01); *B29C 66/81427* (2013.01); *B29C 66/81429* (2013.01); *B29C 66/8322* (2013.01); *B29C 66/91411* (2013.01); *B29C 66/91921* (2013.01); *B29C 66/71* (2013.01); *B29C 66/7392* (2013.01); *B29C 66/73773* (2013.01); *B29C 66/81417* (2013.01); *B29C 66/81423* (2013.01); *F16B 19/10* (2013.01)

(58) Field of Classification Search
CPC ....... B29C 66/20; B29C 66/21; B29C 66/347; B29C 66/81419; B29C 66/34; B29C 66/30; B29C 66/81; B29C 66/81425; B29C 66/81427; B29C 66/81429; B29C 66/83; B29C 66/8322; B29C 66/91; B29C 66/91411; B29C 66/91921
See application file for complete search history.

(56) References Cited

U.S. PATENT DOCUMENTS

| | | | |
|---|---|---|---|
| 4,926,519 A | | 5/1990 | Podlesny et al. |
| 4,966,802 A | * | 10/1990 | Hertzberg ............. B29C 65/601 |
| | | | 112/423 |
| 6,042,315 A | * | 3/2000 | Miller ..................... F16B 19/00 |
| | | | 411/383 |
| 2004/0020970 A1 | * | 2/2004 | Palm .................. B23K 20/1235 |
| | | | 228/112.1 |

FOREIGN PATENT DOCUMENTS

| | | |
|---|---|---|
| FR | 1424663 A | 1/1966 |
| GB | 1093433 A | 12/1967 |
| JP | 58155924 A | 9/1983 |
| JP | 61197223 A | 9/1986 |
| JP | 6271623 A | 4/1987 |
| JP | 1210329 A | 8/1989 |
| JP | 222034 A8 | 1/1990 |
| JP | 10230378 A | 9/1998 |
| JP | 2003011232 A | 1/2003 |
| JP | 2005324362 A | 11/2005 |

* cited by examiner

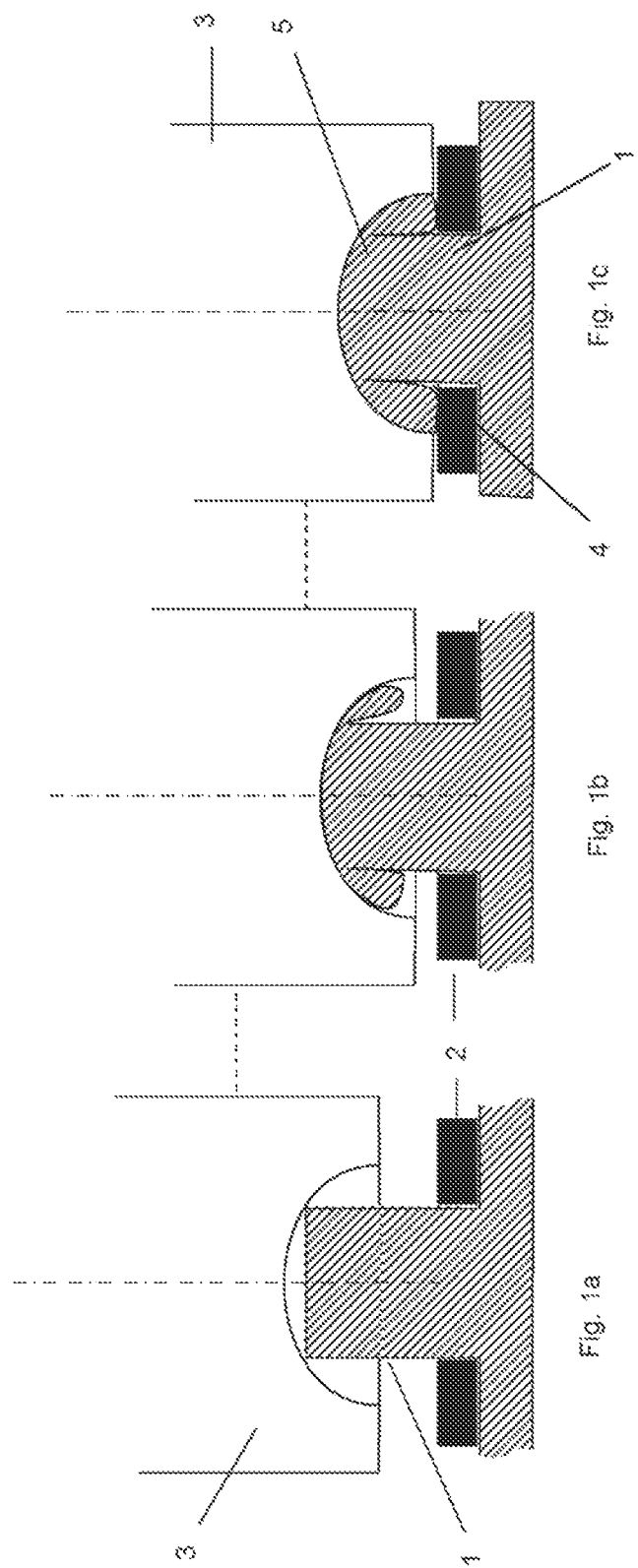

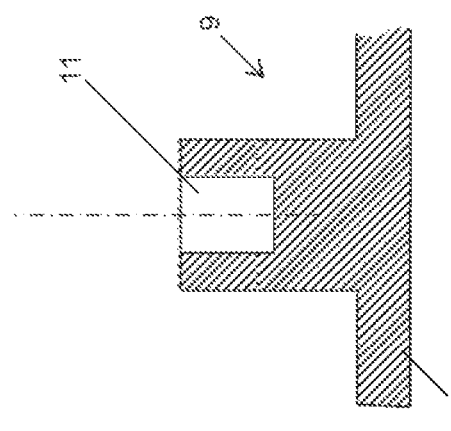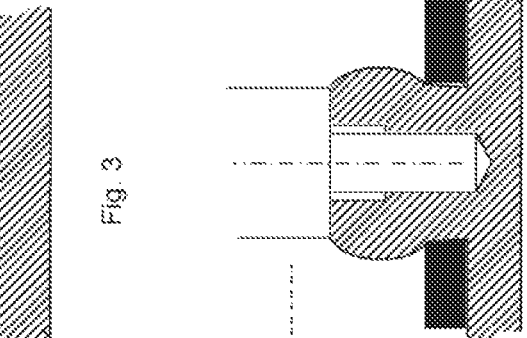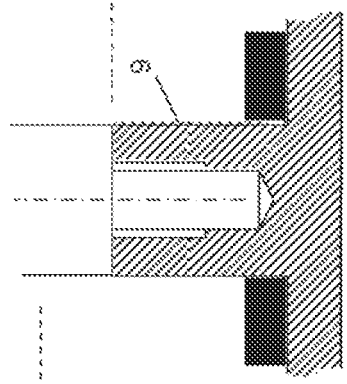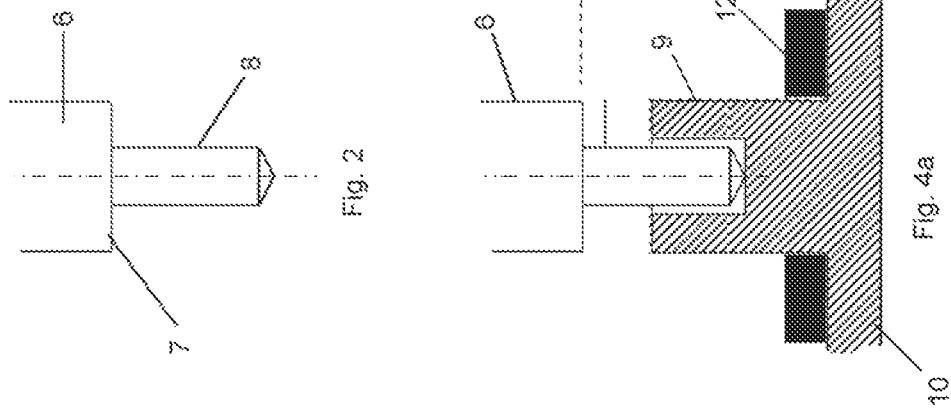

RESHAPING METHOD AND DEVICE FOR CARRYING OUT THE METHOD

CROSS REFERENCE TO RELATED APPLICATIONS

This application is a nationalization of International Application PCT/EP2012/069755 filed Oct. 5, 2012 and claims priority from German Application DE 102011054358.9 filed Oct. 10, 2011 both of which are incorporated by reference.

BACKGROUND OF THE INVENTION

The present invention concerns a method of reshaping a workpiece, in particular an upsetting riveting method, and a device for reshaping a workpiece.

In the reshaping operation, that is to say upon specifically targeted plastic deformation of a workpiece, a force is applied to the workpiece by way of a reshaping tool and the workpiece is thereby reshaped. A distinction is drawn between pressure reshaping, tension-pressure reshaping, tension reshaping, bending reshaping and thrust reshaping.

Particularly in the pressure reshaping process the reshaping tool has an upsetting surface of a contour which substantially corresponds to the desired outside contour of the workpiece to be reshaped. During the reshaping operation that upsetting surface is brought into contact with the workpiece to be reshaped and a force is applied to the workpiece so that it is thereby reshaped.

In the case of many materials it is advantageous if the workpiece to be reshaped is heated during or immediately prior to the reshaping operation.

For heating the workpiece it is possible for example for an ultrasonic vibration, that is to say a vibration between about 16 kHz and about 10 GHz, to be applied to the workpiece. That ultrasonic vibration is absorbed in the workpiece and the workpiece is heated thereby.

Thus it is known for example for a rivet to be reshaped by means of a closing head shaper in the form of a sonotrode. FIGS. 1a through 1c diagrammatically show the method steps applied in a known reshaping method.

The known riveting method is used to join two materials or two elements together. Firstly the rivet 1 comprising a plastic is passed through an opening arranged in the riveting material 2. The rivet 1 is either connected to one of the two elements to be joined or it has a prefabricated setting head which prevents the rivet from being able to be pressed completely through the opening in the riveting material 2.

As can be seen from FIG. 1 in that situation the sonotrode 3, that is to say an element which is acted upon with an ultrasonic vibration, is moved in the direction of the riveting material 2 so that firstly the edges of the end face of the rivet 1 come into contact with the sonotrode 3. The contact of the sonotrode 3 with the rivet 1 means that an ultrasonic vibration is transmitted into the rivet. The ultrasonic vibration is absorbed in the material. The proportion of the absorbed ultrasonic energy depends on the damping constant or the absorption coefficient of the material.

In general the amplitude of the ultrasonic vibration will decrease in the workpiece so that the greatest amplitude is reached at the contact surface relative to the sonotrode and becomes progressively smaller, the further the ultrasonic wave moves away from the sonotrode.

The absorption effect results in heating of the rivet 1. As in the known method the rivet 1 comprises a plastic the material will begin to melt, as shown in FIG. 1b and finally, as shown in FIG. 1c, the material is reshaped by the closing head. Basically, it is possible by means of ultrasound for the workpieces to be shaped to be heated very quickly and in particular only locally so that the desired hot reshaping can take place.

With some materials however the introduction of heat by the ultrasonic vibration is limited to a close region in the proximity of the contact surface relative to the sonotrode That is due on the one hand to the absorption which generally falls exponentially with the spacing relative to the sonotrode. On the other hand those materials exhibit only a low level of thermal conductivity so that the heating effect firstly remains restricted substantially to a portion in the immediate proximity of the sonotrode. If now in addition the workpiece to be reshaped comprises a material which has a heavily temperature-dependent absorption coefficient such that the absorption coefficient becomes greater with temperature, absorption in the region directly in the proximity of the sonotrode is still further increased by the local heating effect, which results in even more greatly localized heating.

In the known method therefore it is only possible for a region in the immediate proximity relative to the sonotrode to be adequately heated, so that it is also only in those regions that effective reshaping take place.

As can be seen in particular from FIG. 1c the closing head 5 produced in that way has cylindrical constriction recesses 4 and very large regions which are actually not homogeneously connected to the rivet, but are only placed around the cylinder. Those regions reduce the stability of the closing head 5. In practice therefore the closing heads produced in that way have to be of larger dimensions than would actually be necessary in consideration of their geometry. Nonetheless even then this does not guarantee adequate strength.

Therefore, based on the described state of the art, the object of the present invention is to provide a method of and a device for reshaping a workpiece, which particularly when reshaping materials with a heavily temperature-dependent damping constant, avoids the above-mentioned disadvantages.

BRIEF SUMMARY OF THE INVENTION

In regard to the method that object is attained in that before the reshaping force is applied to the workpiece at least a first portion of the workpiece is brought to a temperature which differs from the temperature of a second portion of the workpiece, that comes into contact with the reshaping tool.

The invention comprises a method of reshaping a workpiece, in which a reshaping force is exerted on the workpiece by means of a reshaping tool and the workpiece is heated during or before reshaping of the workpiece, wherein heating of the workpiece is effected by at least partial absorption of an ultrasonic vibration in the workpiece where before the reshaping force is applied to the workpiece at least a first portion of the workpiece is brought to a temperature which differs from the temperature of a second portion of the workpiece, that comes into contact with the reshaping tool.

In one embodiment, before the reshaping force is applied to the workpiece the first portion is brought to a temperature which is higher than the temperature of the second portion, preferably by at least 10° C. and particularly preferably by at least 20° C. and best by at least 30° C.

The workpiece to be reshaped is usually of plastic and preferably a part-crystalline plastic.

The workpiece may be in the form of a rivet is reshaped to form a closing head and the rivet may be a hollow rivet and preferably a part-hollow rivet.

In accordance with the method, an ultrasonic vibration may be applied to the first portion to heat the first portion to a temperature higher than the temperature of the second portion.

BRIEF DESCRIPTION OF THE SEVERAL VIEWS OF THE DRAWINGS

FIGS. 1a through 1c show a reshaping method according to the state of the art,

FIG. 2 shows a sonotrode according to the invention of a first embodiment of the invention, FIG. 3 shows a rivet according to the invention of the first embodiment of the invention, FIGS. 4a through 4c show diagrammatic views of the individual steps in the method according to the invention.

DETAILED DESCRIPTION OF THE INVENTION

Figure 5:
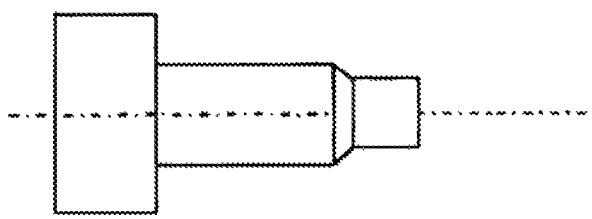
FIGS. 5 through 7 show alternative embodiments of sonotrodes according to the invention.

If for example in the situation shown in FIG. 1a the rivet 1 is heated in the region in which it is passed through the riveting material 2, then, when using a suitable material, when applying an ultrasonic vibration to the rivet 1 by means of the sonotrode, the ultrasonic vibration can be absorbed to an increased degree in the heated portion an that reshaping is effected not or not just in the region of the sonotrode, but also in the heated region.

The underlying idea of the invention is to utilize the temperature-dependent absorption coefficient for more uniform heating of the workpiece by means of ultrasound.

The provision of a temperature gradient within the workpiece to be reshaped, that is to say the provision of a first portion of the workpiece, which is at a different temperature from the second portion which comes into contact with the reshaping tool, provides that it is possible to specifically targetedly select the portion which is intended to present particularly high or optionally particularly low absorption of ultrasonic vibrations so that certain portions of the workpiece can be heated in quite specifically targeted fashion by means of the sonotrode.

In most cases it is advantageous if the first portion, before the reshaping force is applied to the workpiece, is brought to a temperature higher than the temperature of the second portion. In that case the temperature difference is preferably at least 10° C. and particularly preferably at least 20° C. In that respect it will be appreciated that neither the first nor the second portion involve a homogeneous temperature as, by virtue of the finite thermal conductivity, there is always a certain temperature difference within the portion as soon as temperature heating from the exterior is initiated.

The optimum temperature difference to be set depends on the material of the workpiece to be processed. Particularly preferably therefore the first portion of the workpiece is brought to a temperature which differs from the temperature of the first portion so that the damping factor or absorption coefficient in the first portion differs by at least 5% from the damping factor or absorption coefficient of the second portion.

The method according to the invention has great advantages, in particular in reshaping workpieces of plastic, preferably part-crystalline plastic. Examples in that respect are PA6, PA12 and PA66. In principle however the described method according to the invention enjoys great advantages in relation to all part-crystalline high-performance materials.

In principle the first portion can be brought to a temperature higher than the temperature of the second portion, in any desired fashion. In a particularly preferred embodiment however it is provided that the first portion is brought to a higher temperature by means of an impressed ultrasonic vibration.

Thus for example in FIG. 1a the riveting material 2 could be acted upon with a ultrasonic vibration so that, in the portion arranged in the through opening in the riveting material 2, the rivet 1 is heated at its peripheral surface. If then in a further step the sonotrode 3 is moved in a direction towards the rivet 1, an ultrasonic vibration introduced into the rivet 1 by the sonotrode 3 is absorbed to an increased degree in the first portion which was brought to a higher temperature, so that effective reshaping can take place here.

As an alternative thereto the workpiece can also be in the form of a hollow rivet and best in the form of a part-hollow rivet as then heating of the first portion can be effected substantially in the interior of the rivet, more specifically by way of the opening which extends over a part or over the complete rivet.

For example the reshaping tool can have an upsetting surface, by way of which the reshaping force is applied to the workpiece, and a bar which projects beyond the upsetting surface and by way of which heat is introduced into the first portion of the workpiece. That bar can either have a heating device or it can be subjected to the action of an ultrasonic vibration no that heat can be transmitted into the workpiece by way of the ultrasonic vibration.

In regard to the device the foregoing object is attained by a device for reshaping a workpiece comprising a reshaping tool which is in the form of a sonotrode and which is so designed that it can be brought into contact with a workpiece to be reshaped and a reshaping force can be applied to the workpiece. In that case the device has a transducer for producing an ultrasonic vibration, which is possibly connected to the reshaping tool by way of an amplitude transformer. Furthermore in accordance with the invention there is provided a device for heating and/or cooling a first portion of the workpiece to be reshaped and for producing a temperature gradient between the first portion and a second portion of the workpiece that comes into contact with the reshaping tool.

The transducer converts an electric ac voltage into a mechanical vibration. Piezoelectric elements are generally used here. In principle ultrasonic vibration units comprising a transducer and a sonotrode connected thereto possibly by way of an amplitude transformer are known so that there is no need for a detailed description at this juncture.

The reshaping tool preferably has an upsetting surface, by way of which a reshaping force can be applied to the workpiece to be reshaped.

In addition in a preferred embodiment it is provided that the reshaping tool has a bar which preferably projects beyond the upsetting surface, wherein the bar can be heated or acted upon with an ultrasonic vibration. In that case the bar serves as a device for heating the first portion of the workpiece to be reshaped.

The reshaping tool can be in the form of a closing head shaper for reshaping a workpiece in the form of a rivet.

In addition there can be provided a part-hollow rivet which at its side forming the closing head has a recess which does not extend through the entire rivet. Basically the part-hollow rivet forms a kind of pocket, into which the bar is introduced so that the bar heats the inside surfaces of the pocket and the regions adjoining same before the upsetting surface exerts a reshaping force on the workpiece.

In the known upsetting riveting method the upsetting surface of the sonotrode, that is to say the rivet shape, must always be exactly adapted to the material. If that is not done, the situation involves ejection or rivet heads which are not completely shaped out, without strength.

Ejection is a major problem in many sectors as particles can cause damage to other critical components like for example electronic components or switching elements.

In addition the optical impression in regard to visible parts is also not to be disregarded. A poorly shaped rivet head and a rivet head with too much ejection is frequently not accepted in visible situations for purely optical reasons.

The described method makes it possible to almost completely avoid ejection, even un the case of an upsetting surface which is not properly adapted.

In that way the sonotrode can be more easily produced.

Further advantages, features and possible uses of the present invention will be clearly apparent from the description hereinafter of preferred embodiments.

FIG. 2 shows a specific embodiment of a sonotrode 6. The sonotrode 6 has an upsetting surface 7 and a bar 8 projecting beyond the upsetting surface 7. The bar 8 is substantially cylindrical but it has a conical tip.

FIG. 3 shows a rivet 9 of a configuration according to the invention. The rivet 9 has a setting head 10 and a recess 11 which does not extend through the entire rivet 9.

It will be appreciated that, instead of the provision of a setting head 10, the rivet 9 can also be connected directly to a material which is to be joined to the riveting material 12 by the riveting method. As can be seen from FIGS. 4a through 4c the rivet 9 is firstly passed through an opening in the riveting material 12 until the setting head 10 bears against the riveting material 12.

The sonotrode 6 is then moved in the direction of the rivet 9 so that the bar 8 passes into the recess 11 in the rivet 9. In the situation shown in FIG. 4a it is only at its conical tip that the bar 8 is in contact with the rivet, more specifically at the bottom of the recess 11. As the sonotrode 6 performs an ultrasonic vibration that ultrasonic vibration is transmitted in the point of contact between the bar on the one hand and the bottom of the recess in the rivet 9 of the other hand, into the rivet 9. That therefore involves local heating of the rivet 9 in the immediate proximity to the contact surface.

As can be seen from FIG. 4b the sonotrode 6 is hen moved further in the direction of the rivet 9 so that the bar 8 penetrates into the rivet and ultrasonic vibrations are now also transmitted to the rivet 9 with a part of the outside surface of the bar so that then a relatively large portion within the rivet is heated.

If now, as shown in FIG. 4c, the sonotrode 6 comes into contact with its upsetting surface 7 with the rivet 9 and a reshaping force is applied then reshaping preferably occurs in the regions in which a higher temperature prevails, which according to the invention is the region in the immediate proximity with the bar 8. The closing head can now be formed by the measure according to the invention, without constriction recesses being produced.

Figure 6:
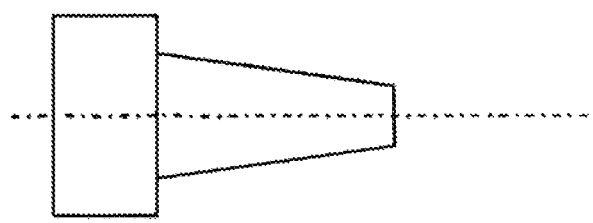
Figure 7:
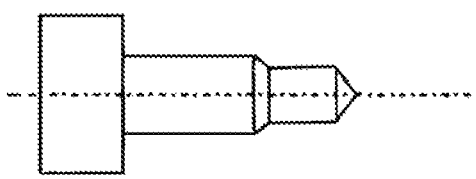

The view in FIGS. 4a through 4c is only diagrammatic. The bar which is fixed to the sonotrode 6 can be of different geometries, thus for example stepped configurations as shown in FIG. 5, frustoconical configurations as shown in FIG. 6, as well as bars with stepped portions and a conical tip, as shown in FIG. 7, are also considered.

Depending on the respective geometry used for the bar it may be advantageous if the corresponding recess in the part-hollow rivet is also of a stepped and/or conical configuration.

LIST OF REFERENCES 1 rivet
2 riveting material
3 sonotrode
4 constriction
5 closing head
6 sonotrode
7 upsetting surface
8 bar
9 rivet
10 setting head
11 recess
12 riveting material

What is claimed is:

1. A method of reshaping a workpiece with a reshaping force applied by a reshaping tool, in which, prior to applying the reshaping force, a first portion of the workpiece is brought to a temperature higher than a temperature of a second portion of the workpiece so that a temperature gradient is provided within the workpiece, to be reshaped, between said first and second portions and wherein a direction of the reshaping force is oriented with respect to arrangement of said second and first portions so that reshaping is effected in said first portion of the workpiece when the reshaping force, from the reshaping tool, is applied upon said second portion of the workpiece; wherein, the reshaping tool comprises a sonotrode and wherein, after formation of the temperature gradient, the reshaping tool is brought into contact with the workpiece to be reshaped, so that the second portion of the workpiece is heated during or before reshaping of the workpiece by at least partial absorption of ultrasonic vibration provided to the workpiece by the sonotrode and the reshaping force, from the reshaping tool, is first applied to the second portion of the workpiece.

2. A method as set forth in claim 1 wherein the temperature of the first portion is brought to a temperature which is at least 10° C. higher than the temperature of the second portion.

3. A method as set forth in claim 1 wherein the temperature of the first portion is brought to a temperature which is at least 20° C. higher than the temperature of the second portion.

4. A method as set forth in claim 1 wherein the temperature of the first portion is brought to a temperature which is at least 30° C. higher than the temperature of the second portion.

5. A method as set forth in claim 1 wherein the workpiece comprises plastic.

6. A method as set forth in claim 1 wherein the workpiece comprises a part-crystalline plastic.

7. A method as set forth in claim 1 wherein the workpiece is in the form of a rivet and is reshaped to form a closing head.

8. A method as set forth in claim 1 wherein an ultrasonic vibration is applied to the first portion to heat the first portion to a temperature higher than the temperature of the second portion.

9. A method as set forth in claim 7 wherein the workpiece is an at least partially hollow rivet.

10. A method as set forth in claim 7 wherein the reshaping tool has an upsetting surface which is brought into contact with the workpiece during the reshaping operation and by way of which a force is applied to the workpiece, wherein the reshaping tool further has a bar which projects beyond the upsetting surface and by way of which heat is introduced into the first portion of the workpiece.

11. A method as set forth in claim 8 wherein the reshaping tool has an upsetting surface which is brought into contact with the workpiece during the reshaping operation and by way of which a force is applied to the workpiece, wherein the reshaping tool further has a bar which projects beyond the upsetting surface and by way of which heat is introduced into the first portion of the workpiece.

12. A method as set forth in claim 9 wherein the reshaping tool has an upsetting surface which is brought into contact with the workpiece during the reshaping operation and by way of which a force is applied to the workpiece, wherein the reshaping tool further has a bar which projects beyond the upsetting surface and by way of which heat is introduced into the first portion of the workpiece.

\* \* \* \* \*